United States Patent [19]

Otto et al.

[11] Patent Number: 5,689,265

[45] Date of Patent: Nov. 18, 1997

[54] DEVICE FOR MEASURING A LEVEL OF MATERIAL USING MICROWAVES

[75] Inventors: Johanngeorg Otto, Hausen; Stefan Burger, Freiburg; Peter Gerst, Weil, all of Germany

[73] Assignee: Endress & Hauser GmbH & Co., Maulburg, Germany

[21] Appl. No.: 728,535

[22] Filed: Oct. 9, 1996

Related U.S. Application Data

[63] Continuation of Ser. No. 284,430, filed as PCT/EP93/03458 Dec. 8, 1993, abandoned.

[30] Foreign Application Priority Data

Dec. 11, 1992 [DE] Germany .................. 42 41 910.7

[51] Int. Cl.$^6$ ...................................................... G01S 13/08
[52] U.S. Cl. .......................... 342/124; 340/612; 340/617; 340/618; 73/1 H
[58] Field of Search .................. 342/124; 340/612, 340/617, 618; 73/1 H

[56] References Cited

U.S. PATENT DOCUMENTS

| | | | |
|---|---|---|---|
| 4,044,353 | 8/1977 | Levy | 343/14 |
| 4,210,023 | 7/1980 | Sakamoto et al. | 343/14 |
| 4,665,403 | 5/1987 | Edvardsson | 342/124 |
| 4,737,791 | 4/1988 | Jean et al. | 342/124 |
| 5,006,785 | 4/1991 | Revus et al. | 324/639 |
| 5,136,299 | 8/1992 | Edvardsson | 342/124 |
| 5,365,178 | 11/1994 | Van Der Pol | 324/644 |
| 5,406,842 | 4/1995 | Locke | 364/509 |

FOREIGN PATENT DOCUMENTS

| | | |
|---|---|---|
| 58-90129 | 5/1983 | Japan . |
| 60-125524 | 7/1985 | Japan . |
| 9214124 | 8/1992 | WIPO . |

Primary Examiner—J. Woodrow Eldred
Attorney, Agent, or Firm—Rose McKinney & Evans

[57] ABSTRACT

A level measuring device using microwaves comprises an antenna for sending transmitted waves toward the surface of a material whose level is to be measured, and for the reception of echo waves resulting from reflection at the surface, and a receiving and evaluating circuit which derives from the echo waves received by the antenna an echo function representative of the echo amplitudes as a function of the distance and determines from the echo function the transit time of the microwaves from the antenna to the surface of the material and therefrom the distance of the surface of the material from the antenna. In order to detect the formation of deposits of the material on the antenna or further trouble conditions, such as damage to the antenna or the loss thereof, the level measuring device comprises an arrangement which compares a section of the echo function originating from a reference reflection point in the antenna or in the vicinity of the antenna with a predetermined threshold value and produces a signal indicating the existence of a state above or below the said threshold value. The reference reflection point may be constituted by a part of the antenna or a separate reference reflector mounted in the antenna or in the vicinity thereof.

24 Claims, 5 Drawing Sheets

DEVICE FOR MEASURING A LEVEL OF MATERIAL USING MICROWAVES

This is a continuation of application Ser. No. 08/284,430, filed as PCT/EP93/03458 Dec. 8, 1993, now abandoned.

The invention relates to a level measuring device using microwaves comprising an antenna for sending transmitted waves toward the surface of a material whose level is to be measured, and for the reception of echo waves resulting from reflection at the surface, and a receiving and evaluating circuit adapted to derive from the echo waves received by the antenna an echo function representative of the echo amplitudes as a function of the distance and to determine from the echo function the transit time of the microwaves from the antenna to the surface of the material and therefrom the distance of the surface of the material from the antenna.

For level measurement using microwaves all those known methods are suitable which permit the measurement of comparatively short distances by means of reflected microwaves. The most familiar examples thereof are pulsed radar and frequency modulation continuous wave radar (FMCW radar). In the case of pulsed radar short microwave pulses are transmitted periodically, which are reflected from the object whose position is to be measured and after a transit time, which is dependent on the distance, are received again. The received signal amplitude versus time function constitutes the echo function. Every value of this echo function corresponds to the amplitude of an echo due to reflection at a certain distance from the antenna. In the case of the FMCW method a continuous microwave is transmitted, which is periodically linearly frequency modulated, for example in accordance with a saw-tooth function. The frequency of each received echo signal hence differs in frequency from the instantaneous frequency, which the transmitted signal has at the time of reception, by an amount which is dependent on the transit time of the echo signal. The difference in frequency between the transmitted signal and the received signal, which may be obtained by mixing the two signals and evaluation of the Fourier spectrum of the mixed signal, accordingly corresponds to the distance of the reflecting surface from the antenna, and the level of the frequency characteristic corresponds to the magnitude of the echo amplitude. This Fourier spectrum, therefore, constitutes the echo function in this case.

A particular problem in connection with level measurement using microwaves is that a deposit of material may build up on the antenna. This danger is more particularly to be found in the case of dusty or pulverulent material, more especially if the antenna is moist, and furthermore in the case of sticky and viscous materials. While microwave antennas tolerate a certain degree of fouling, they cease to be operational if the deposit layer is excessive. In this case the radar signal will be completely absorbed at the antenna so that no useful echo may be detected. Using conventional methods it is accordingly no longer possible to distinguish whether there is no reflector present in the beam path, whether there is heavy attenuation in the beam path clear of the antenna (for instance in the case of foam on the material) or whether the antenna has been blocked by the formation of a deposit.

The object of the invention is to provide a level measuring device using microwaves of the type noted initially, which permits the recognition of the formation of deposits on the antenna and of further trouble conditions such as, for instance, damage to or loss of the antenna.

In order to achieve this object the level measuring device in accordance with the invention comprises an arrangement for comparing a section of the echo function originating from a reference reflection point in the antenna or in the vicinity of the antenna with a predetermined threshold value, and for producing a signal indicating the existence of a state above or below the threshold value.

The invention is based on the recognition that the echo function section originating from reflection in the vicinity of the antenna changes in a characteristic fashion, if the antenna bears a deposit of material. Such reflection may more particularly originate from the antenna itself if the same is for example in the form of a horn feeder. While there is a general tendency to achieve optimum antenna matching to avoid discontinuities in impedance so that there is no troublesome local reflection, which would swamp the wanted signal, there is in practice nevertheless internal reflection, as for example with a horn feeder, at the point where feed into the antenna takes place. The reference reflection point employed in the level measuring device of the invention is to cause reference reflection which is as distinct as possible and is readily replicated and which in the echo function is clearly able to be distinguished from reflection caused by feed to the antenna. Should such a reference reflection point not already be available, then in accordance with a preferred form of the invention a reference reflector is mounted at a defined distance from the point of feed to the antenna. The threshold value, with which the echo function section originating from the reference reflection point is compared, is so set that this section of the echo function exceeds the threshold value, if no or merely a low degree of deposit has been formed on the antenna, but that such section is below the threshold value if the formation of deposit on the antenna exceeds a certain degree. The signal indicating a state above or below the threshold value will consequently indicate whether the level measuring device is satisfactorily operating or whether there is a malfunction thereof owing to such deposit formation on the antenna.

Advantageous developments and features of the invention are defined in the dependent claims.

Further features and advantages of the invention will be understood from the following description of a working embodiment in conjunction with the drawings in which.

Figure 1:
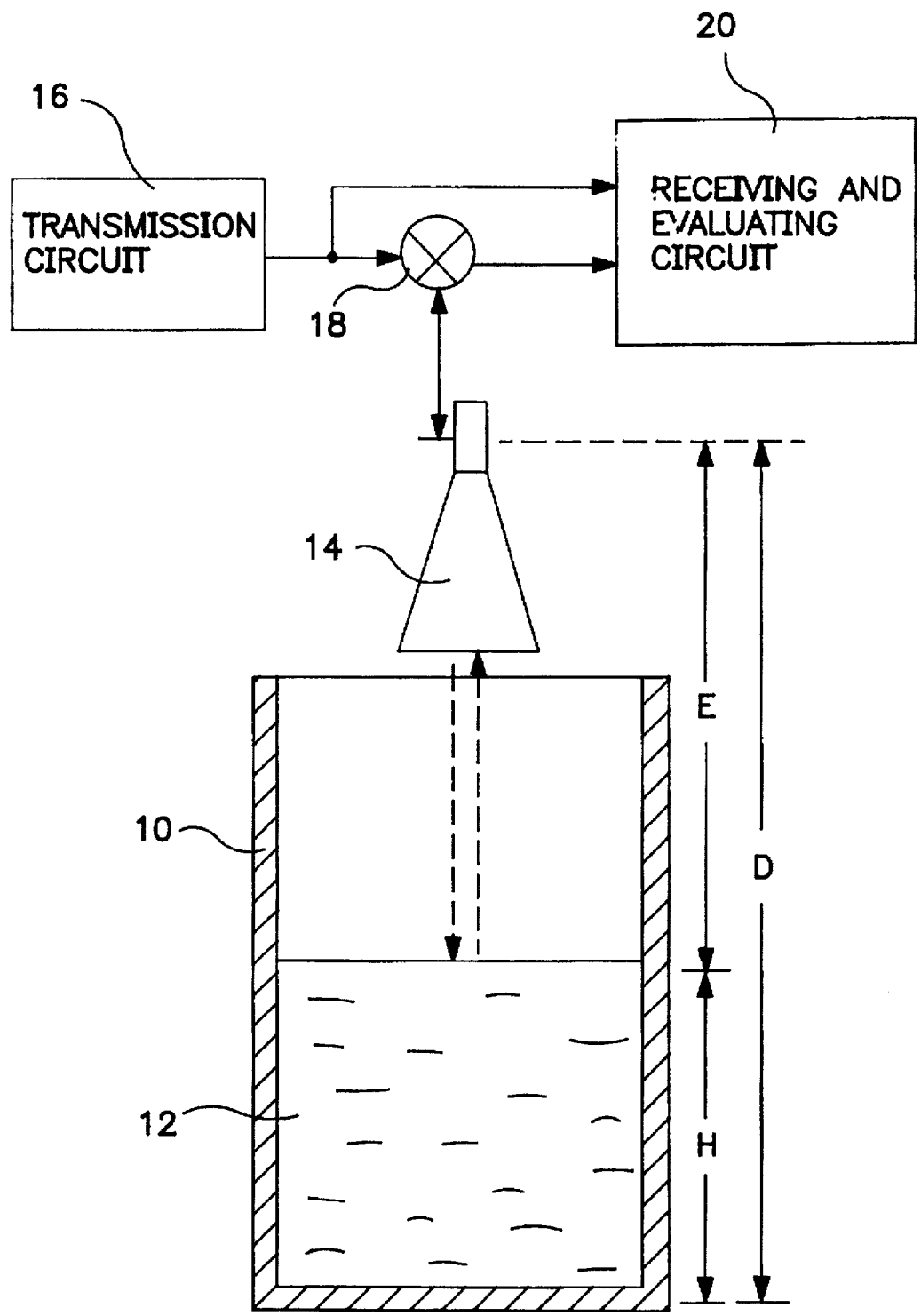
FIG. 1 shows the principle of a level measuring device operating with microwaves.

FIG. 1 in the drawings shows a container 10, which is filled up to a height or level H with a material 12. For measuring the level H an antenna 14 is mounted above the container 10, which transmits an electromagnetic wave toward the surface of the material 12 and which can receive the echo wave due to reflection at the surface. The transmitted electromagnetic wave is produced by a transmission circuit 16, which is connected via a transmit-receive switch 18 with the antenna 14. The echo wave received by the antenna 18 is supplied via the transmit-receive switch 18 to a receiving and evaluating circuit 20, which on the basis of the transmitted signal supplied by the transmission circuit 16 to the antenna 14 and the received signal supplied by the antenna 14 determines the distance E between the antenna 14 and the surface of the material 12. Since the distance D of the antenna 14 from the bottom of the container 10 is known, the difference between this distance D and the measured distance E will be the sought material level H.

Since the distances to be measured are extremely small in comparison with the speed of propagation of the electromagnetic waves, very short waves must be utilized in order to attain sufficient accuracy of measurement, which are in the microwave range. The antenna 14 is naturally designed for the transmission and the reception of such short waves; it is for example fitted with a horn feeder as is indicated in FIG. 1.

For the measurement of the distance E any known radar method can be employed. All such methods are based on the principle that the transit time of the electromagnetic waves from the antenna to the reflecting surface and back to the antenna again is measured. Since the speed of propagation of the electromagnetic waves is known it is possible to compute the path traveled from the transit time measured. Since besides the useful echo, which results from reflection at the surface to be detected, interfering echoes may occur as well, it is conventional for the entire received signal to be converted into an echo function, which represents the intensity distribution of the received signal as a function of the distance. From this echo function the useful echo is determined and the transit time thereof ascertained.

One known radar method is pulsed radar, in the case of which short pulses are periodically transmitted and in a reception phase following each transmission of a pulse the echo signals at the frequency of the transmitted pulse are detected. In this case the signal amplitude received in the course of each reception phase against time will directly constitute the echo function. Each value of this echo function corresponds to the amplitude of an echo due to reflection at a certain distance from the antenna. The position of the useful echo in the echo function will therefore directly indicate the distance to be measured.

Direct transit time measurement is avoided in the frequency modulation continuous wave method (FMCW method). In such method a continuous microwave is transmitted, which is periodically linearly frequency modulated, for example in accordance with a saw-tooth function. The frequency of each received echo signal consequently differs in frequency from the instantaneous frequency, which the transmitted signal has at the time of reception, by an amount which is dependent on the transit time of the echo signal. The difference in frequency between the transmitted signal and the received signal, which may be obtained by mixing the two signals and evaluation of the Fourier spectrum of the mixed signal, accordingly corresponds to the distance of the reflecting surface from the antenna, and the level of the frequency characteristic corresponds to the magnitude of the echo amplitude. This Fourier spectrum, therefore, constitutes the echo function in this case.

The antenna serves for feeding into the process, the best possible impedance match being employed in order to avoid impedance discontinuities so that no interfering local reflections occur, which would swamp the wanted signal. Nevertheless in practice, for instance with a horn feeder, internal reflection will occur at the point of feed into the antenna and at the horn.

A particular problem in connection with level measurement using microwaves is that a deposit of material may build up on the antenna. This danger is more particularly to be found in the case of dusty or pulverulent material, more especially if the antenna is moist, and furthermore in the case of sticky and viscous materials. While microwave antennas tolerate a certain degree of fouling, they cease to be operational if the deposit layer is excessive. In this case the radar signal will be completely absorbed at the antenna so that no useful echo may be detected. Using conventional methods it is accordingly no longer possible to distinguish whether there is no reflector present in the beam path, whether there is heavy attenuation in the beam path clear of the antenna (for instance foam on the material) or whether the antenna has been blocked by the formation of a deposit.

Figure 2:
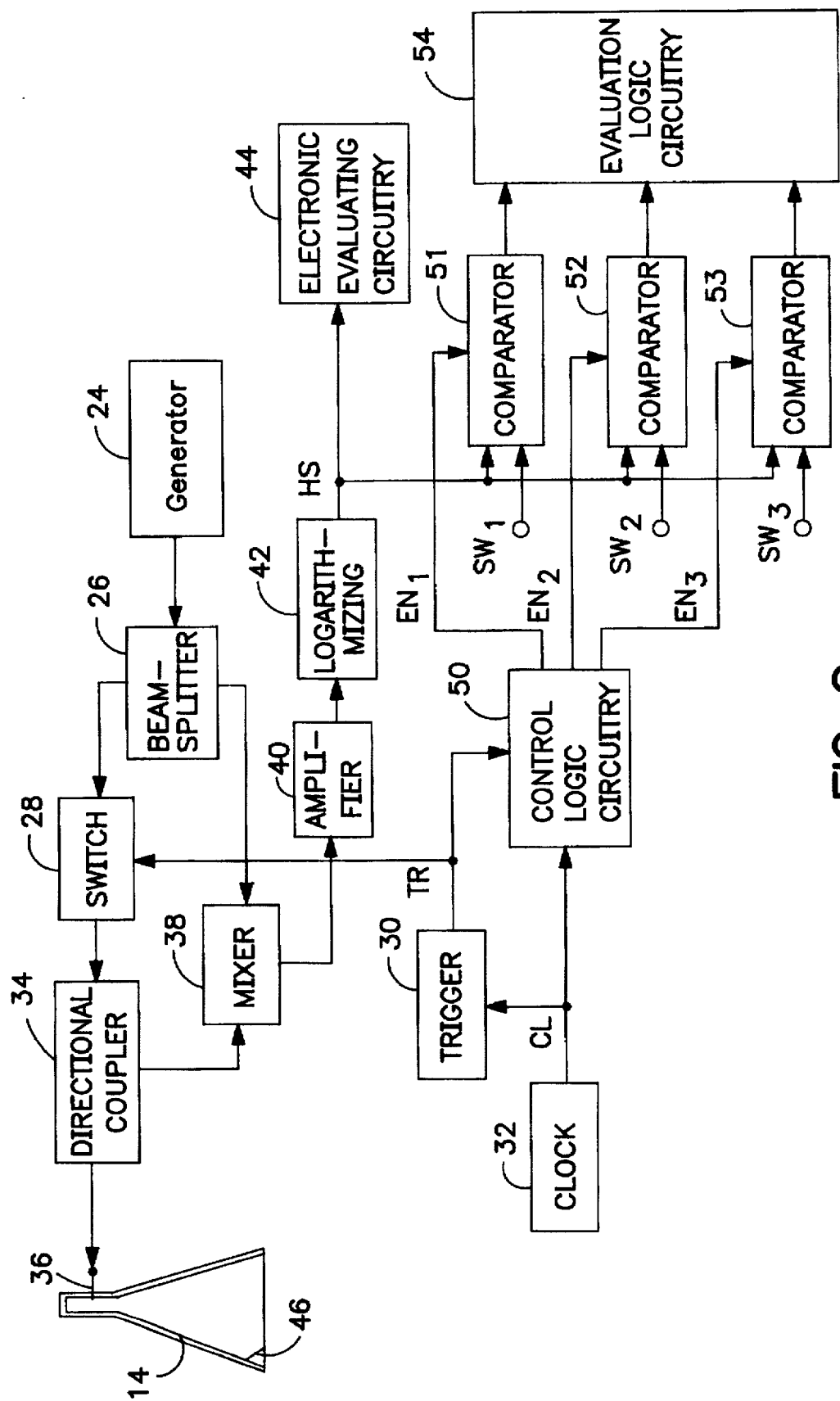
FIG. 2 is a block circuit diagram of a level measuring device having means for detection of the formation of a deposit on the antenna and of further trouble conditions.

FIG. 2 shows a block circuit diagram of the transmission circuit and of the receiving and evaluating circuit of a level measuring device operating in accordance with the pulsed radar method, in the case of which additional measures have been adopted in order to recognize the formation of deposits on the antenna and possibly other trouble conditions.

FIG. 2 again diagrammatically shows the antenna 14 in the form of a horn feeder. A generator 24 produces a continuous ultrahigh frequency oscillation with the frequency of the microwaves to be transmitted, which is supplied via a beam splitter 26 to a switch 28. The switch 28 is periodically operated by a trigger signal TR, which is produced by a trigger 30 on the basis of a clock signal CL supplied by a clock 32.

The output of the switch 28 is connected via a directional coupler 34, which assumes the role of the transmit-receive switch in FIG. 1, with the feed pin 36 of the antenna 14. Each time the switch 28 is closed a short time a short pulse is transmitted from the antenna 14. The echo signals received as a consequence of the transmission of pulses by the antenna are supplied via the directional coupler 34 to one input of a mixer 38, which at its second input gets a signal derived from the output signal of the generator 24 by the beam splitter 26. The envelope signal obtained by the mixing of the two signals in the mixer 38 is amplified in an amplifier 40 whose output is connected with a logarithmizing circuit 42, which compensates for the attenuation, dependent on the transit time, of the echo signals. The logarithmized and amplified envelope signal HS delivered at the output of the logarithmizing circuit 42 and which represents the echo function, is supplied to electronic evaluating circuitry 44, which from it determines the transit time of the working echo and the distance E sought.

Figure 3:
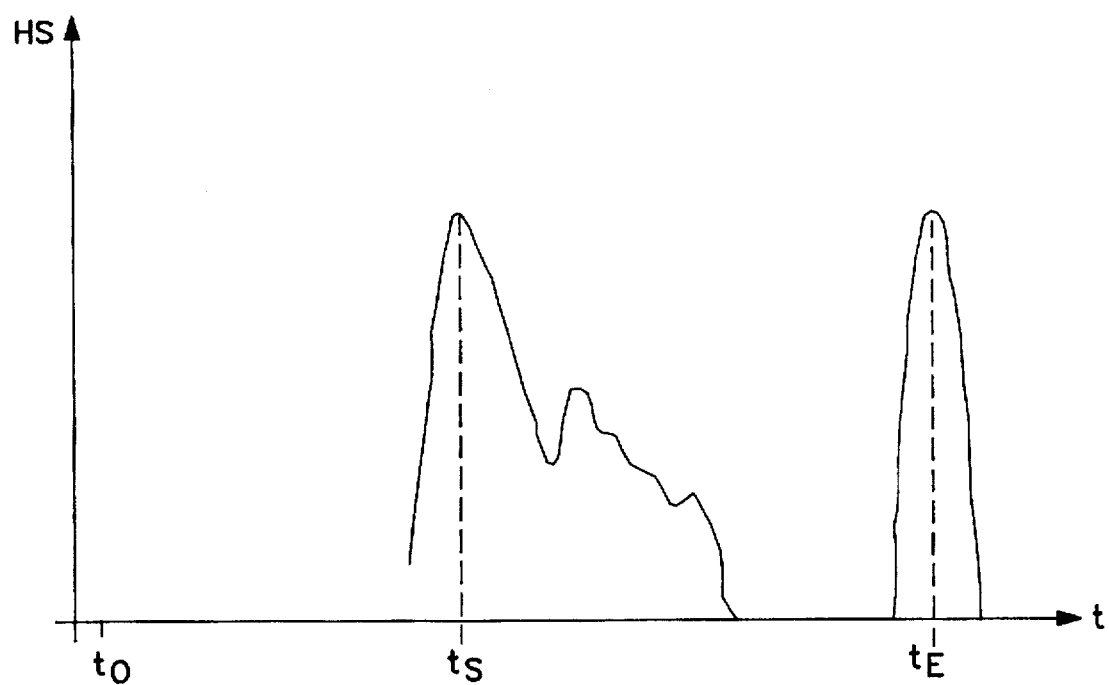
FIG. 3 shows the echo function of a conventional antenna, when there is no deposit on the antenna.
Figure 4:
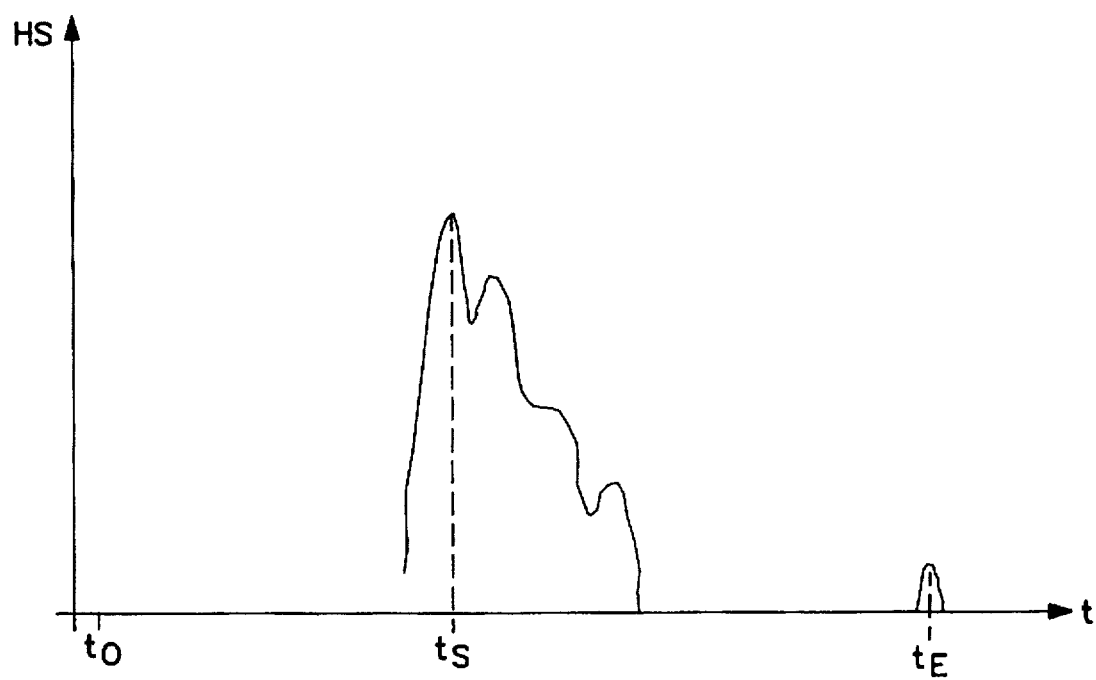
FIG. 4 shows the echo function of the same antenna as in FIG. 3 when there is a deposit.

The part of the circuit in FIG. 2 so far described is the same as a conventional distance measuring device operating with reflected electromagnetic waves as familiar to those in the art. The diagram of FIG. 3 shows the echo function represented by the envelope signal HS, of such a conventional distance measuring device in a case in which there is no deposit formation or other trouble condition, whereas the diagram of FIG. 4 shows the corresponding echo function when there is a substantial deposit on the antenna. The instant $t_0$ corresponds to the start of the trigger pulse supplied by the trigger 30 to the switch 28, and which causes the closing of the switch 28. At the instant $t_s$ the transmission pulse, produced by the switch 28, arrives at the feed pin 36 of the antenna 14, this causing a distinct peak in the echo function. This is followed by echoes decreasing in amplitude which are due to reflections occurring at the horn feeder. At the instant $t_E$ the diagram of FIG. 4 comprises a further distinct peak, which corresponds to the reception of the useful echo.

From the diagram in FIG. 4 it appears that when there is a considerable deposit on the antenna, the form of the echo function at the antenna is altered in a characteristic fashion, since owing to absorption by the deposit less energy will be reflected from this part. Furthermore in the echo function of FIG. 4 the echo amplitude originating from the useful echo is so greatly attenuated that it is now insufficient for evaluation.

The recognition of deposits on the antenna 14 is in the case of the distance measuring device in accordance with FIG. 2 based on the evaluation of the characteristic changes of the part of the echo function, which stems from reflection at the antenna part. This is something which is certainly possible in the case of the echo functions with the form depicted in FIGS. 3 and 4. It is, however, more convenient, if a reference reflection point is present in the antenna part to produce a reference echo with a distinct reflection peak. In many cases such a reference reflection point can be constituted by a part of the antenna present in any case, for example by the edge of the horn feeder. Should such a reference reflection point not be present, then preferably a special reference reflector is mounted in the antenna area. FIG. 2 shows such a reference reflector 46, which is arranged at the edge of the horn feeder of the antenna 14 in such a manner that it projects into the interior of the horn feeder. The reference reflector can be a screwed on sheet metal component, a wire loop, a groove, a corrugation or the like. The arrangement adjacent to the antenna edge is advantageous in order to produce a distinct separation between the peak due to feeding action and the peak caused by the reference reflector in the echo function. If desired the reference reflector may also be arranged at a small distance in front of the antenna.

Figure 5:
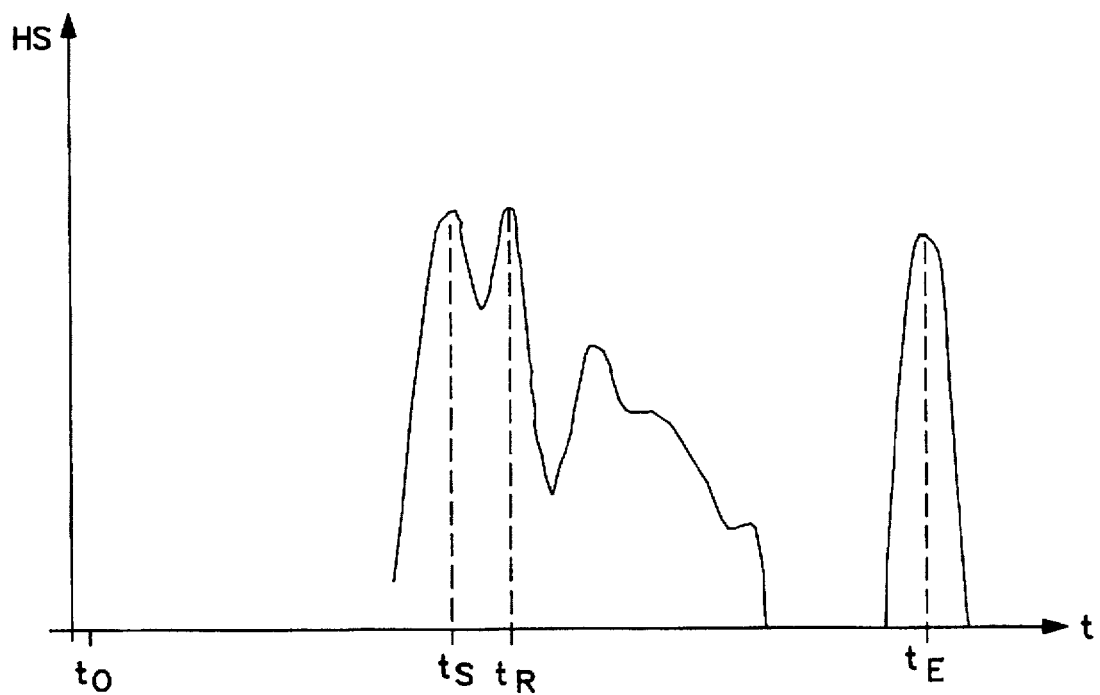
FIG. 5 shows the echo function of the an antenna fitted with a reference reflector, when there is no deposit formed on the antenna.
Figure 6:
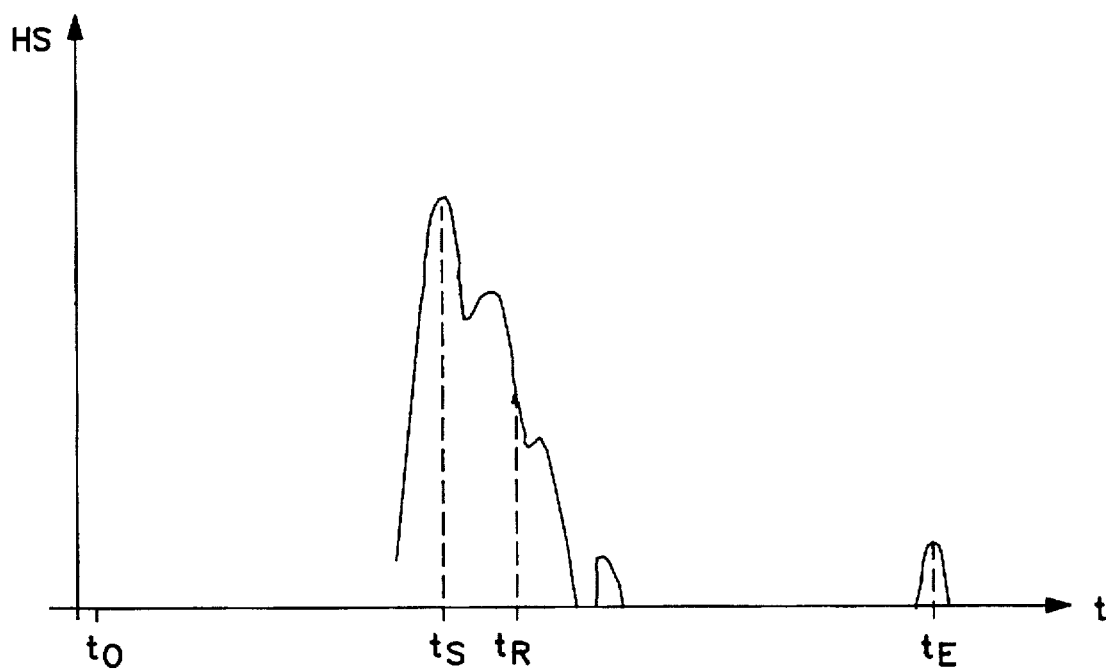
FIG. 6 shows the echo function of the same antenna as in FIG. 5 when there is a deposit.

The diagrams of FIGS. 5 and 6 show in an analogous manner to the diagrams of FIGS. 3 and 4 the echo functions of an antenna fitted with such an additional reference reflector with and, respectively, without a build up of deposit on the antenna. The echo information represented in the diagram in FIG. 5 comprises the peak caused by the reference reflector 46 at the instant $t_R$ in addition to the peaks caused by the feed at the instant $t_s$ and by the useful echo at the instant $t_E$. The echo function in FIG. 6 shows that characteristic changes caused by the build up of a deposit are very distinct, in particular at the reference peak, and permit a clear distinction to be drawn between the two conditions.

For the evaluation of the characteristic changes, due to the deposit formation, in the echo function the circuit of FIG. 2 comprises control logic circuitry 50 and an amplitude comparator 51, which at its first input receives the envelope signal HS from the output of the logarithmizing device 42 and at its second input receives a threshold value signal $SW_1$. The amplitude comparator 51 is designed in a conventional manner so that its output signal assumes one or the other of two signal values dependent on whether the envelope signal HS supplied to the first input is larger or smaller than the threshold value $SW_1$ supplied to the second input. The amplitude comparator 51 furthermore possesses a control input, which receives an enable signal $EN_1$ from one output of the control logic circuitry 50. The control logic circuitry 50 receives the clock signal CL supplied by the clock 32 and the output signal TR supplied by the trigger 30, such output signal determining the points in time for transmission; on the basis of such two signals it produces the enable signal $EN_1$ so that the amplitude comparator 51 is only enabled during a certain time window after the transmission of a pulse for the performance of amplitude comparison.

Figure 7A:
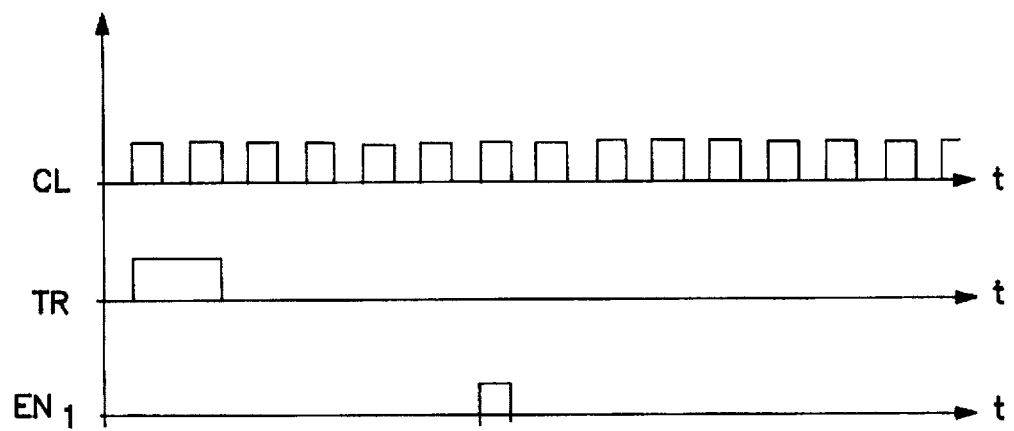
FIG. 7 shows diagrams to explain the fashion of operation of the level measuring device in accordance with FIG. 2.
Figure 7B:
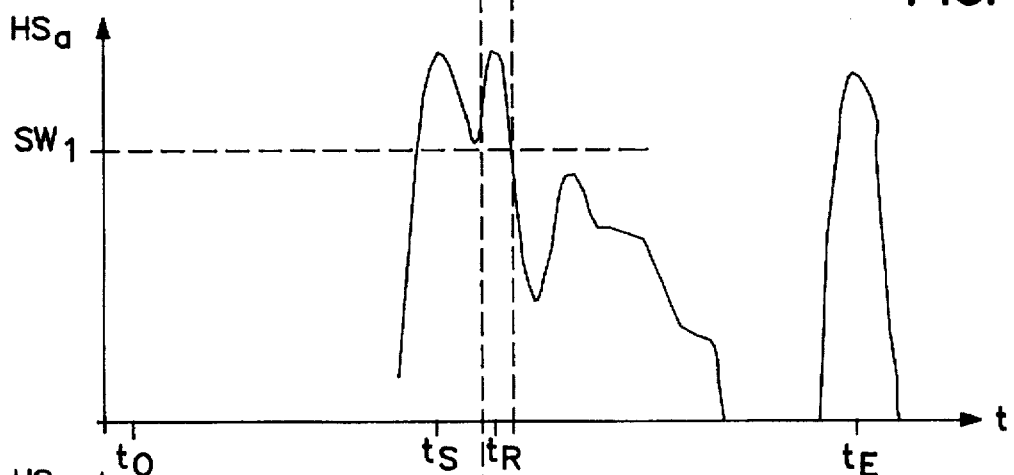
Figure 7C:
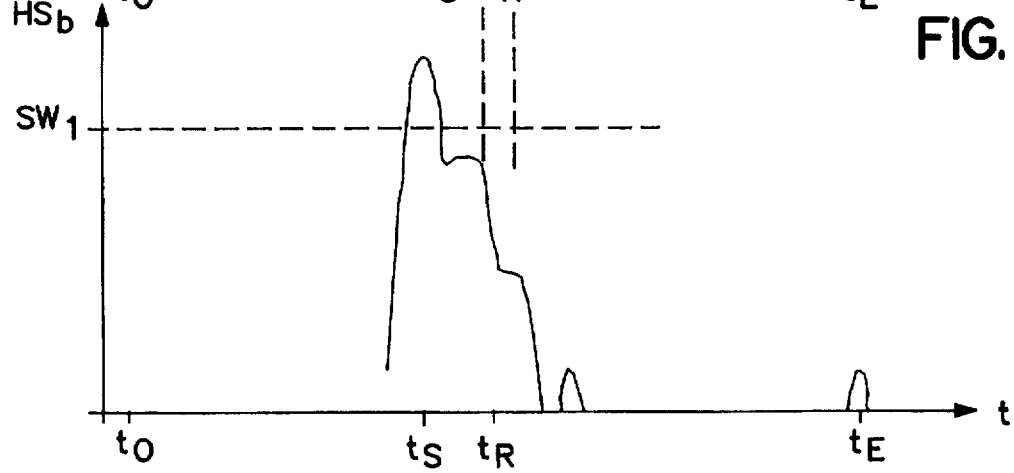

The function of the comparator 51 and of the control logic circuitry 50 is apparent from the diagrams in FIG. 7. Such diagrams show the course of the envelope signals $HS_a$ and $HS_b$, which correspond to the echo functions of FIG. 5 and, respectively, FIG. 6, and furthermore the clock signal CL supplied by the clock 32, the trigger signal TR from the trigger 30 and the enable signal $EN_1$ supplied by the control logic circuitry 50. In the diagrams for the two envelope signals $HS_a$ and $HS_b$ the threshold value $SW_1$ of the comparator 51 is marked. The control logic circuitry 50 produces the enable signal $EN_1$ at a time, which is exactly set by the clock signal CL, after the start of the trigger signal TR so that the time window $T_1$ as set by the enable signal $EN_1$ corresponds to that time interval in which the reference echo, caused by the reference reflector 46, appears in the envelope signal. In this time window the comparator 51 compares the envelope signal HS with the threshold value $SW_1$. It will be seen that envelope signal $HS_a$ corresponding to the antenna without a deposit thereon in the time window $T_1$ exceeds the threshold value $SW_1$ of the comparator; the output signal of the comparator 51 hence assumes a first signal value, as for example the low signal value, which indicates that there is no interfering deposit formation on the antenna 14. On the contrary the envelope signal $HS_b$, corresponding to the antenna with deposit formation thereon, in the time window $T_1$ will keep below the threshold value $SW_1$ so that the output signal of the comparator 51 will assume the second signal value—in the example selected, the high signal value—which indicates that there is a deposit of the antenna which may cause the level measuring to be incorrect or even impossible.

The timing and the duration of the enable signal $EN_1$ and furthermore the level of the comparator threshold value $SW_1$ constitute three adjustable parameters, by means of which the circuit can be adapted to suit different conditions of operation. The selection of the timing of the enable signal permits in particular the adaptation to different positions of the reference reflector. The duration of the enable signal is so set that the reference echo, dependent on its form, is employed in an optimum fashion. The level of the comparator threshold value is selected in a manner dependent on the degree of deposit formation, as from which interference with level measuring may be expected.

The output signal from the comparator may be utilized in different manners. In the simplest case it can be used to indicate the formation of a deposit or raising an alarm in order to warn the operator who will then take the necessary action. However it may also be employed to initiate automatic measures, which despite the formation of a deposit will render further measuring possible, as for example by increasing the transmission power and/or by increasing the reception gain.

As shown in FIG. 2, it is possible to provide further comparators 52, 53, . . . in addition to the comparator 50, which compare the envelope signal HS with different threshold values $SW_2$, $SW_3$ . . . and receive enable signals $EN_2$, $EN_3$ from the control logic circuitry 50, such enable signals being identical or different. Such additional comparators render possible a finer differentiation for monitoring of deposit formation, an indication of the current degree of fouling or the monitoring of further causes of interference. For example a comparator whose threshold value is set to be higher than the threshold value $SW_1$ indicated in FIG. 7 may indicate the start of deposit formation before the same interferes with measurements or renders them impossible. A comparator, whose threshold value is yet below the reference echo amplitude applying for very heavy deposit formation, may indicate complete failure of the antenna system or of the electronic circuitry. The output signal of this and any further comparators with different threshold values and/or time windows can be supplied to an evaluating logic circuitry 54, which evaluates the output signals for more exactly determining the errors and causes of interference and specifying the same in more detail.

The above mentioned method of recognizing formation of deposit may be employed, in the same manner as with the pulsed radar device described as an example, also in a frequency modulation continuous wave radar device or in any other distance measuring device operating with microwaves, which supplies an echo function of the above mentioned type.

We claim:

1. A level measuring device using microwaves comprising an antenna for sending transmitted waves toward the surface of a material whose level is to be measured and for receiving echo waves resulting from reflection of the transmitted waves at the surface, a receiving and evaluating circuit adapted to derive from the echo waves received by the antenna an echo function representative of the echo amplitudes as a function of the distance between the antenna and the surface of the material and to determine from the echo function the transit time of the microwaves from the antenna to the surface of the material and therefrom the distance of the surface of the material from the antenna, a reference reflection point situated in at least one of the antenna and the vicinity of the antenna, and an arrangement for comparing a section of the echo function originating from said reference reflection point with a predetermined threshold value in order to detect a condition of the antenna.

2. The level measuring device as claimed in claim 1, wherein said reference reflection point is constituted by a part of the antenna.

3. The level measuring device as claimed in claim 2, wherein said antenna comprises a horn feeder and said reference reflection point is constituted by the edge of the horn feeder.

4. The level measuring device as claimed in claim 1, wherein said reference reflection point is constituted by a reference reflector mounted in at least one of the antenna and the vicinity thereof.

5. The level measuring device as claimed in claim 4, wherein said antenna comprises a horn feeder and said reference reflector is mounted at the edge of the horn feeder.

6. The level measuring device as claimed in claim 1, wherein the receiving and evaluating circuit comprises an arrangement for producing an envelope signal representing the echo function, at least one comparator having a first input to receive the envelope signal, a second input to receive a threshold value signal, and an output to provide a signal, which dependent on which of the first and second input signals possesses the greater value, assumes the one or the other of two signal values, and a control logic circuitry supplies each comparator with an enable signal to permit comparison during a time window, wherein the echo signal stemming from the reference reflection point appears in the echo function.

7. The level measuring device as claimed in claim 6, wherein several comparators are provided, which receive different threshold value signals and/or different enable signals.

8. The level measuring device as claimed in claim 7, wherein the outputs of the comparators are connected with an evaluating logic circuitry.

9. The level measuring device as claimed in claim 2, wherein the receiving and evaluating circuit comprises an arrangement for producing an envelope signal representing the echo function, at least one comparator having a first input to receive the envelope signal, a second input to receive a threshold value signal, and an output to provide a signal, which dependent on which of the first and second input signals possesses the greater value, assumes the one or the other of two signal values, and a control logic circuitry supplies each comparator with an enable signal to permit comparison during a time window, wherein the echo signal stemming from the reference reflection point appears in the echo function.

10. The level measuring device as claimed in claim 3, wherein the receiving and evaluating circuit comprises an arrangement for producing an envelope signal representing the echo function, at least one comparator having a first input to receive the envelope signal, a second input to receive a threshold value signal, and an output to provide a signal, which dependent on which of the first and second input signals possesses the greater value, assumes the one or the other of two signal values, and a control logic circuitry supplies each comparator with an enable signal to permit comparison during a time window, wherein the echo signal stemming from the reference reflection point appears in the echo function.

11. The level measuring device as claimed in claim 4, wherein the receiving and evaluating circuit comprises an arrangement for producing an envelope signal representing the echo function, at least one comparator having a first input to receive the envelope signal, a second input to receive a threshold value signal, and an output to provide a signal, which dependent on which of the first and second input signals possesses the greater value, assumes the one or the other of two signal values, and a control logic circuitry supplies each comparator with an enable signal to permit comparison during a time window, wherein the echo signal stemming from the reference reflection point appears in the echo function.

12. The level measuring device as claimed in claim 5, wherein the receiving and evaluating circuit comprises an arrangement for producing an envelope signal representing the echo function, at least one comparator having a first input to receive the envelope signal, a second input to receive a threshold value signal, and an output to provide a signal, which dependent on which of the first and second input signals possesses the greater value, assumes the one or the other of two signal values, and a control logic circuitry supplies each comparator with an enable signal to permit comparison during a time window, wherein the echo signal stemming from the reference reflection point appears in the echo function.

13. A level measuring device comprising an antenna for sending transmitted waves toward the surface of a material whose level is to be measured and for receiving echo waves resulting from reflection of the transmitted waves at the surface, a receiving and evaluating circuit adapted to derive from the echo waves received by the antenna the distance of the surface of the material from the antenna, a reference reflection point situated in at least one of the antenna and the vicinity of the antenna, and an arrangement for comparing a section of the echo function originating from said reference reflection point with a predetermined threshold value.

14. The level measuring device as claimed in claim 13, wherein said reference reflection point is constituted by a part of the antenna.

15. The level measuring device as claimed in claim 14, wherein said antenna comprises a horn feeder and said reference reflection point is constituted by the edge of the horn feeder.

16. The level measuring device as claimed in claim 13, wherein said reference reflection point is constituted by a reference reflector mounted in at least one of the antenna and the vicinity thereof.

17. The level measuring device as claimed in claim 16, wherein said antenna comprises a horn feeder and said reference reflector is mounted at the edge of the horn feeder.

18. The level measuring device as claimed in claim 13, wherein the receiving and evaluating circuit derives an echo function from the echo waves received by the antenna representative of echo amplitudes as a function of the distance between the antenna and the surface of the material and comprises an arrangement for producing an envelope signal representing the echo function, at least one comparator having a first input to receive the envelope signal, a second input to receive a threshold value signal, and an output to provide a signal, which dependent on which of the first and second input signals possesses the greater value, assumes the one or the other of two signal values, and a control logic circuitry supplies each comparator with an enable signal to permit comparison during a time window, wherein the echo signal stemming from the reference reflection point appears in the echo function.

19. The level measuring device as claimed in claim 18, wherein several comparators are provided, which receive different threshold value signals and/or different enable signals.

20. The level measuring device as claimed in claim 19, wherein the outputs of the comparators are connected with an evaluating logic circuitry.

21. The level measuring device as claimed in claim 14, wherein the receiving and evaluating circuit derives an echo function from the echo waves received by the antenna representative of echo amplitudes as a function of the distance between the antenna and the surface of the material and comprises an arrangement for producing an envelope signal representing the echo function, at least one comparator having a first input to receive the envelope signal, a second input to receive a threshold value signal, and an output to provide a signal, which dependent on which of the first and second input signals possesses the greater value, assumes the one or the other of two signal values, and a control logic circuitry supplies each comparator with an enable signal to permit comparison during a time window, wherein the echo signal stemming from the reference reflection point appears in the echo function.

22. The level measuring device as claimed in claim 15, wherein the receiving and evaluating circuit derives an echo function from the echo waves received by the antenna representative of echo amplitudes as a function of the distance between the antenna and the surface of the material and comprises an arrangement for producing an envelope signal representing the echo function, at least one comparator having a first input to receive the envelope signal, a second input to receive a threshold value signal, and an output to provide a signal, which dependent on which of the first and second input signals possesses the greater value, assumes the one or the other of two signal values, and a control logic circuitry supplies each comparator with an enable signal to permit comparison during a time window, wherein the echo signal stemming from the reference reflection point appears in the echo function.

23. The level measuring device as claimed in claim 16, wherein the receiving and evaluating circuit derives an echo function from the echo waves received by the antenna representative of echo amplitudes as a function of the distance between the antenna and the surface of the material and comprises an arrangement for producing an envelope signal representing the echo function, at least one comparator having a first input to receive the envelope signal, a second input to receive a threshold value signal, and an output to provide a signal, which dependent on which of the first and second input signals possesses the greater value, assumes the one or the other of two signal values, and a control logic circuitry supplies each comparator with an enable signal to permit comparison during a time window, wherein the echo signal stemming from the reference reflection point appears in the echo function.

24. The level measuring device as claimed in claim 17, wherein the receiving and evaluating circuit derives an echo function from the echo waves received by the antenna representative of echo amplitudes as a function of the distance between the antenna and the surface of the material and comprises an arrangement for producing an envelope signal representing the echo function, at least one comparator having a first input to receive the envelope signal, a second input to receive a threshold value signal, and an output to provide a signal, which dependent on which of the first and second input signals possesses the greater value, assumes the one or the other of two signal values, and a control logic circuitry supplies each comparator with an enable signal to permit comparison during a time window, wherein the echo signal stemming from the reference reflection point appears in the echo function.

* * * * *